No. 650,869. Patented June 5, 1900.
J. H. REDFERN.
MANICURE IMPLEMENT.
(Application filed Sept. 28, 1899.)
(No Model.)
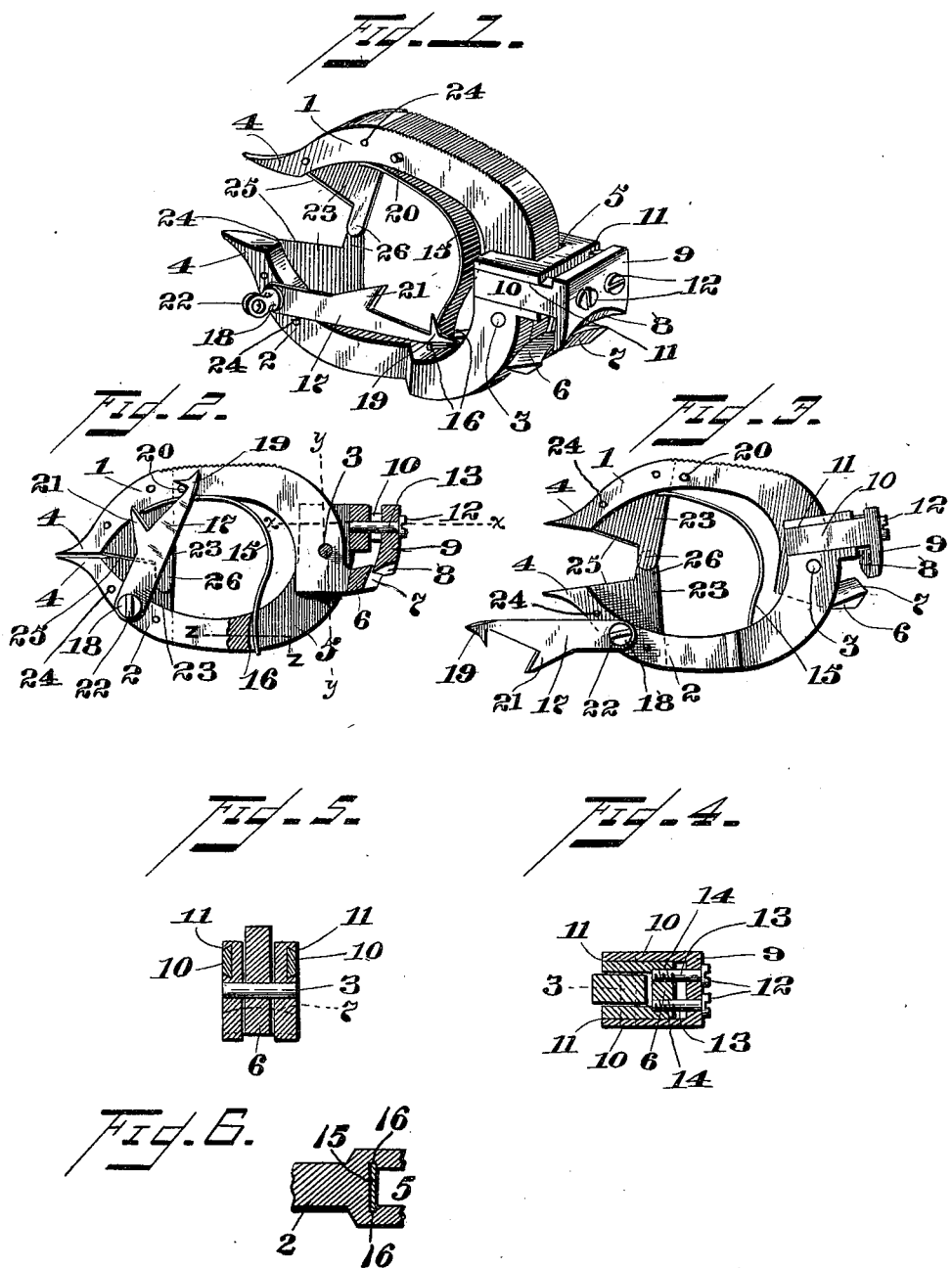
Witnesses
Marcus L. Byng.
R. M. Smith.
James H. Redfern, Inventor
by E. G. Siggers, Attorney
THE NORRIS PETERS CO., PHOTO-LITHO., WASHINGTON, D. C.

UNITED STATES PATENT OFFICE.

JAMES H. REDFERN, OF BAY MILLS, MICHIGAN.

MANICURE IMPLEMENT.

SPECIFICATION forming part of Letters Patent No. 650,869, dated June 5, 1900.

Application filed September 28, 1899. Serial No. 731,939. (No model.)

*To all whom it may concern:*

Be it known that I, JAMES H. REDFERN, a citizen of the United States, residing at Bay Mills, in the county of Chippewa and State of Michigan, have invented certain new and useful Improvements in Manicure Implements, of which the following is a specification.

This invention relates to manicure implements, and has for its object the production of a simple, convenient, and efficient implement having provision whereby the finger-nails may be trimmed in an artistic manner and projecting pieces of skin, &c., removed around the nails.

The device also embodies a pair of tweezers for removing superfluous hair, a scraper for cleaning beneath the nails, and a keeper for holding the handles and jaws closed when not in use.

The implement also embodies means whereby the jaws may be relatively adjusted for maintaining the same in operative relation to each other.

Other objects and advantages of the invention will appear in the course of the subjoined description.

The invention consists in a manicure implement embodying certain novel features and details of construction and arrangement of parts, as hereinafter fully described, illustrated in the drawings, and incorporated in the claims.

In the accompanying drawings, Figure 1 is a perspective view of a manicure implement constructed in accordance with the present invention, showing the handles and jaws open and the scraper folded. Fig. 2 is a side elevation of the same, partly in section, showing the handles held together by the keeper and also showing the means for adjusting and positioning the movable cutting-jaw. Fig. 3 is a side elevation showing the scraper extended in its operative position. Fig. 4 is a cross-section on the line $x\,x$ of Fig. 2, showing the engagement between the adjustable cutting-jaw and the handle to which it is attached. Fig. 5 is a detail cross-section taken on the line $y\,y$ of Fig. 2. Fig. 6 is a detail section on the line $z\,z$ of Fig. 2.

Similar numerals of reference designate corresponding parts in all the figures of the drawings.

The manicure implement contemplated in this invention comprises a pair of handles 1 and 2, each of which is curved longitudinally in arc shape. These handles are crossed and connected at the point of crossing by means of a pivot 3, the concave edges of the handles being presented toward each other and terminating at their extremities in pointed tweezer-jaws 4, which may be used for removing splinters and superfluous hairs from the skin and also in removing small particles of dead skin. One of the jaws is provided with a curved slot 5, through which the other jaw passes, and one of the handles is provided with a cutting-jaw 6, having an arcuate or curved working edge 7, which coöperates with the correspondingly-curved edge 8 of a second jaw 9, secured to the other handle. The jaw 9 is provided at opposite sides with parallel stems 10, which are of dovetailed shape in cross-section and which enter and slide within correspondingly-shaped dovetail grooves 11 in the opposite side faces of the handle 2. By this construction the jaw 9 is capable of movement relatively to the handle 2, so as to bring its working edge 8 into proper working relation to the edge 7 of the jaw 6. In order to adjust the jaw 9 and fix the adjustment, one or more adjusting and fixing screws 12 are employed, which pass through and are journaled or swiveled in the body portion of the jaw 9, said screw or screws having each a threaded shank 13, which engages a threaded opening 14 in the handle 2. By turning these screws the jaw 9 may be accurately adjusted into working relation to the jaw 6, and when so adjusted is held fixed by means of said screws. By constructing the cutting-jaws with arcuate or curved working edges a curved cut is afforded which in a single operation will trim a finger-nail to the desired shape. The jaws are normally held apart by means of a spring 15, the side edges of one end of which are seated in oppositely-located grooves 16 in the slotted handle 2 at one end of the slot 5. The free portion of the spring is curved to conform somewhat to the inner contour of the handle 1 and bears at its free end against the inner portion of said handle, serving to spread the jaws apart and hold them normally in that condition.

In order to hold the handles together when the device is not in use, I employ a keeper-hook 17, which is fastened by means of a pivot and clamping-screw 18 to one of the arms, while the hook 19 at the free end of the keeper is adapted to engage a laterally-extending pin 20 on the opposite handle of the device. The extreme end of the keeper 17 is pointed to form a pry or pick for starting splinters or superfluous hairs preparatory to their extraction by the tweezer-jaws 4. The keeper 17 is also provided at a point intermediate its ends with a laterally-projecting pointed scraper 21, to be used for removing dirt from beneath the nails. When used for this purpose, the keeper is arranged, as shown in Fig. 3, to extend longitudinally from the end of the handle, to which it is pivotally connected by the clamping-screw 18. Said screw is provided with a ring or eye 22, forming a handle by which it may be tightened or loosened and also forming means for attaching a chain to the device to prevent its accidental loss when carried upon the person. When the scraper is not in use, the keeper 17 is folded between the handles 1 and 2, with its extremity pointing in the direction of the pivoted ends of the handles, as illustrated in Fig. 1, where it will be out of the way and not interfere with the operation of trimming the nails. Each of the handles 1 and 2 is also provided adjacent to the tweezer-jaws 4 with shear-blades 23, fastened to the handles, as at 24, and having relatively-oblique cutting edges 25, which are actuated by the compression of the handles and which are designed for the removal of surplus or dead flesh or skin from the hands. The shear-blades 23 are provided at their inner corners with overlapping heel extensions 26, forming guard-fingers to prevent injury to the hands while operating the cutting-jaws by preventing portions of the hands and fingers from getting caught between the inner corners of the jaws. These heel extensions 26 also slide in contact with each other and preserve the alinement of the blades 23.

From the foregoing it will be seen that I have provided a very simple, compact, and efficient manicure implement which may be safely carried in the pocket and which is capable of performing all of the operations necessary for manicuring and treating the hands, and particularly the finger-nails. It will also be understood that various changes in the form, proportion, and minor details of construction may be resorted to without departing from the principle or sacrificing any of the advantages of the invention.

Having thus described my invention, what I claim as new, and desire to secure by Letters Patent, is—

1. In a manicure implement, a pair of handles, two cutting-jaws respectively carried thereby and having arcuate working edges extending transversely of the handles, and means for regulating the distance between the working planes of said edges.

2. In a manicure implement, pivoted handles, cutting-jaws thereon, having arcuate working edges, a stem on one jaw having a sliding engagement with its handle, and an adjusting-screw passing through the jaw into the handle.

3. In a manicure implement, pivoted handles, cutting-jaws thereon having arcuate working edges, a stem on one jaw having a dovetailed sliding engagement with one of the handles, and fixing means for said jaw.

4. In a manicure implement, pivoted handles, arcuate-edged cutting-jaws thereon, parallel stems on one jaw having a sliding engagement with one handle, and fixing means for said jaw.

5. In a manicure implement, arcuate-edged cutting-jaws thereon, parallel stems on one jaw slidable in facial grooves in one handle, and an adjusting and fixing screw passing through the jaw into the handle.

6. In a manicure implement, crossed and pivoted handles, arcuate-edged cutting-jaws on adjacent ends thereof, tweezer-jaws at the opposite ends, and intermediate shear-blades with overlapping heel extensions.

7. In a manicure implement, pivoted handles, arcuate-edged cutting-jaws thereon, a keeper-hook pivoted to one handle, clamping means for the hook, and a lateral scraper on the hook.

In testimony that I claim the foregoing as my own I have hereto affixed my signature in the presence of two witnesses.

JAMES H. REDFERN.

Witnesses:
W. H. FULLER,
ALFRED C. BAILEY.